No. 843,151. PATENTED FEB. 5, 1907.
G. A. KENNER & R. FOLKEL.
CAR LOADER.
APPLICATION FILED APR. 13, 1906.
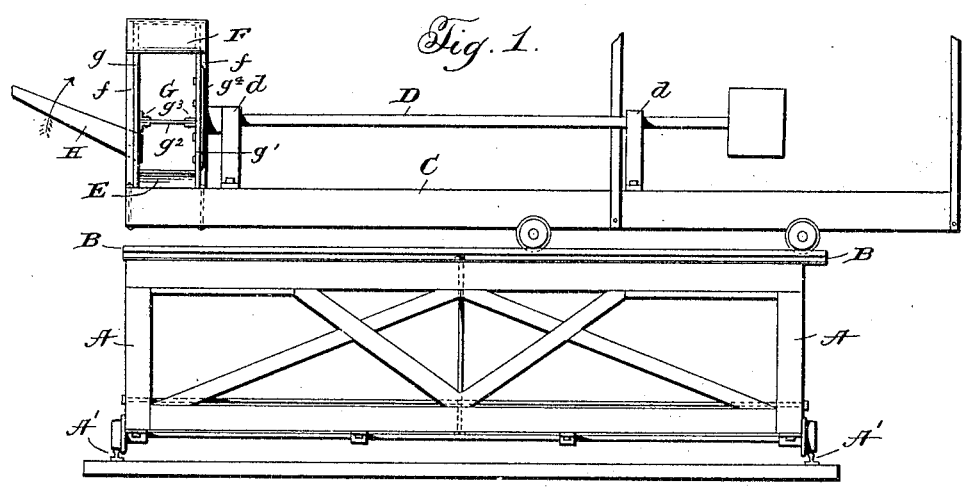
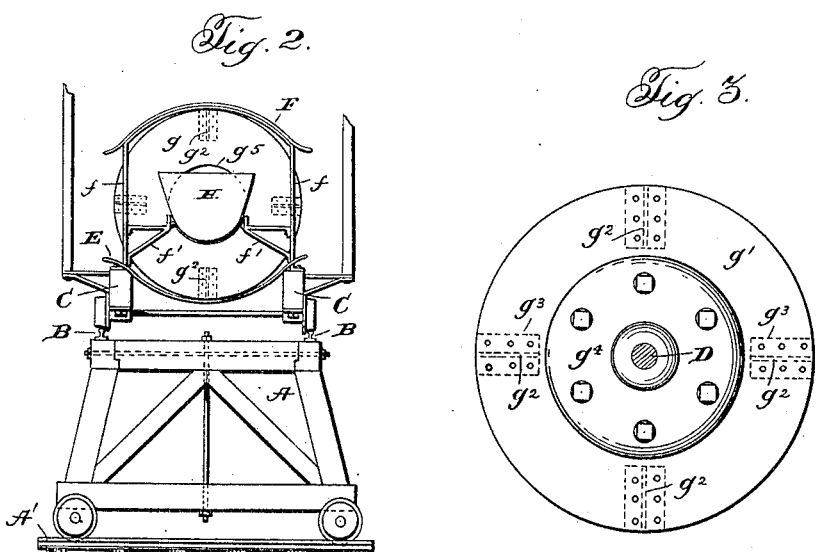
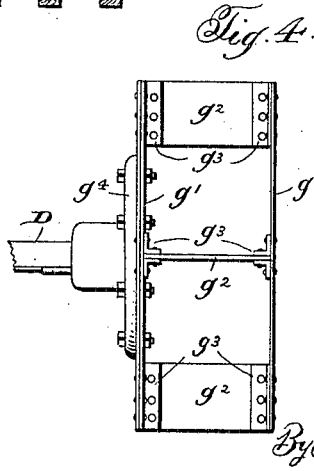
Witnesses:
Jas. E. Hutchinson.
Tho. R. Heath.
Inventors:
George A. Kenner, and
Robert Folkel,
By Jas. Hunter Attorney

UNITED STATES PATENT OFFICE.

GEORGE A. KENNER AND ROBERT FOLKEL, OF HERRIN, ILLINOIS.

CAR-LOADER.

No. 843,151.  Specification of Letters Patent.  Patented Feb. 5, 1907.

Application filed April 13, 1906. Serial No. 311,512.

*To all whom it may concern:*

Be it known that we, GEORGE A. KENNER and ROBERT FOLKEL, citizens of the United States, residing at Herrin, in the county of Williamson and State of Illinois, have invented certain new and useful Improvements in Car-Loaders, of which the following is a specification, reference being had therein to the accompanying drawings.

This invention relates to an improvement in car-loaders, and more particularly to that type of loader designed to supply and distribute granular material to the interior of the car.

The object of the present invention is the provision of a simple form of distributer which will effectually distribute the material to all parts of the car.

A further object of the invention is the provision of improved means for conveying the material into position to be acted upon by the distributer.

Other objects of the invention will be apparent from the detail description hereinafter, when read in connection with the accompanying drawings, forming a part hereof, wherein like numerals of reference refer to similar parts in the several views and wherein a preferable embodiment of my invention is shown.

In the drawings, Figure 1 is a side elevation of our improved car-loader. Fig. 2 is a front elevation thereof, and Figs. 3 and 4 are detail views of the distributer-wheel.

Referring now more particularly to the drawings, A designates a truck or carriage, which is positioned for movement on the rails A′, which are positioned at one side of and extend parallel to the tracks, on which are positioned cars to be loaded. Secured to the upper side of the truck A and extending transversely thereof are the tracks B, upon which is supported a truck or carriage C.

D designates a shaft extending longitudinally of the truck or carriage C and journaled in suitable bearings $d$, secured to the upper side thereof. The rear end of the shaft D extends into a cab carried by the truck C and is adapted to be driven by a motor therein of any suitable construction. This motor may also be utilized in any suitable manner for moving the truck C backward and forward on the tracks B. Secured to the forward end of the truck C and extending transversely thereof is a dished or concave apron E, the ends of which extend outwardly beyond the sides of said truck.

F designates an apron, similar in shape to the apron E, which is supported in an inverted position thereabove by standards $f$, extending upwardly from the sides of the truck C.

G designates a rotary distributer-head, which is secured to the shaft D and is positioned between the aprons E and F. The distributer-head G comprises the disks $g$ and $g'$, between the outer portions of which are secured a plurality of radially-disposed blades $g^2$. The blades $g^2$ are preferably secured to the disks $g$ and $g'$ by angle-irons $g^3$, as this affords a very rigid construction. Bolted to the rear side of the disk $g'$ is a reinforce-plate $g^4$, which has formed integral therewith a sleeve adapted to receive the forward end of the shaft D. The disk $g$ is provided with a centrally-arranged opening $g^5$ therein.

H designates a delivery-chute the lower end of which projects into the opening $g^5$, formed in the disk $g$ of the distributer G. The delivery-chute is secured between brackets $f'$, extending inwardly from the standards $f$, which support the upper apron F and is preferably pivoted therebetween, so that when not in use it may be moved upwardly to lie alongside of the front plate of the distributer-wheel.

Having described the construction of our improved car-loader, the operation thereof is as follows: The truck or carriage A is first moved alongside of the car to be loaded, and the truck C is then moved longitudinally to cause the forward end thereof to project into the car in the usual manner. With the truck C in this position the delivery-chute H, which has previously been lowered, will project outwardly beyond the opposite side of the car, and when material is fed thereinto it will be conducted to the apron E, from whence it will be swept into the interior of the car by the blades of the rotary distributer-wheel, which extend into proximity thereto. The apron F, which is positioned above the distributer-wheel, serves to prevent any material from being thrown upwardly against the roof of the car.

With our device it will be obvious that one end of the car will first be loaded and the rotation of the distributer-wheel will be reversed to effect the loading of the other end thereof.

We do not desire to limit ourselves to the precise form and construction shown in the drawings, as it is obvious that many minor changes might be made thereto without departing from the spirit of the invention.

What we claim is—

1. In a car-loader, a concave apron, a distributer-wheel positioned thereabove comprising a pair of disks and blades secured radially between the outer portion thereof, one of said disks being secured to a drive-shaft and the other of said disks being provided with centrally-disposed opening therein, and a relatively fixed delivery-chute, the lower end of which extends into the opening formed in one side of the distributer-wheel.

2. In a car-loader, oppositely-curved separated plates, and a distributer-wheel positioned therebetween, said distributer-wheel comprising separated disks, the peripheries of which extend into proximity to said curved plates.

3. In a car-loader, oppositely-curved separated plates, a distributer-wheel positioned therebetween, said distributer-wheel comprising separated disks, the peripheries of which extend into proximity to said curved plates, and means for feeding material onto one of the curved plates between the disks of the distributer-wheel.

4. In a car-loader, oppositely-curved separated plates, and a distributer-wheel positioned therebetween, said distributer-wheel comprising separated disks, the peripheries of which extend into close proximity to said curved plates to form a substantially close joint therewith, and radial blades secured between said disks, one of said disks being formed with an opening centrally thereof to permit material to be fed therethrough onto one of the curved plates between the disks of the distributer-wheel.

5. In a car-loader, oppositely-disposed curved separated plates, a distributer-wheel positioned therebetween comprising separated disks and connecting radial blades, the peripheries of said disks extending into proximity to said curved plates for a portion of the length thereof, and one of said disks being formed with an inlet-opening centrally thereof, and a relatively fixed delivery-chute, the lower end of which extends into the opening formed in said disk.

6. In a car-loader, a relatively fixed frame, a concaved apron secured thereon, a distributer-wheel positioned above said apron comprising separated disks and connecting radial blades, one of said disks being provided with an inlet-opening centrally thereof, and a delivery-chute pivotally secured to said frame, the delivery end of said chute being adapted to enter the inlet-opening in said disk when the same is moved to its lowered position.

7. In a car-loader, oppositely-curved separated plates, and a distributer-wheel positioned therebetween, said distributer-wheel comprising separated disks, the peripheries of which extend into proximity to said curved plates to form a substantially closed joint therewith, and radial blades secured between the outer portions of said disks, the outer ends of said blades being flush with the peripheries of said disks, and one of said disks being formed with an opening centrally thereof to permit material to be fed therethrough onto one of the curved blades between the disks of the distributer-wheel.

In testimony whereof we affix our signatures in presence of two witnesses.

GEORGE A. KENNER.
ROBERT FOLKEL.

Witnesses:
P. H. CARROLL,
H. P. LANCASTER.